Feb. 21, 1967  W. D. ELENBURG  3,304,747
ELASTOMER SHOCK ABSORBER FOR A DRIVE SYSTEM
Filed March 26, 1965  2 Sheets-Sheet 2
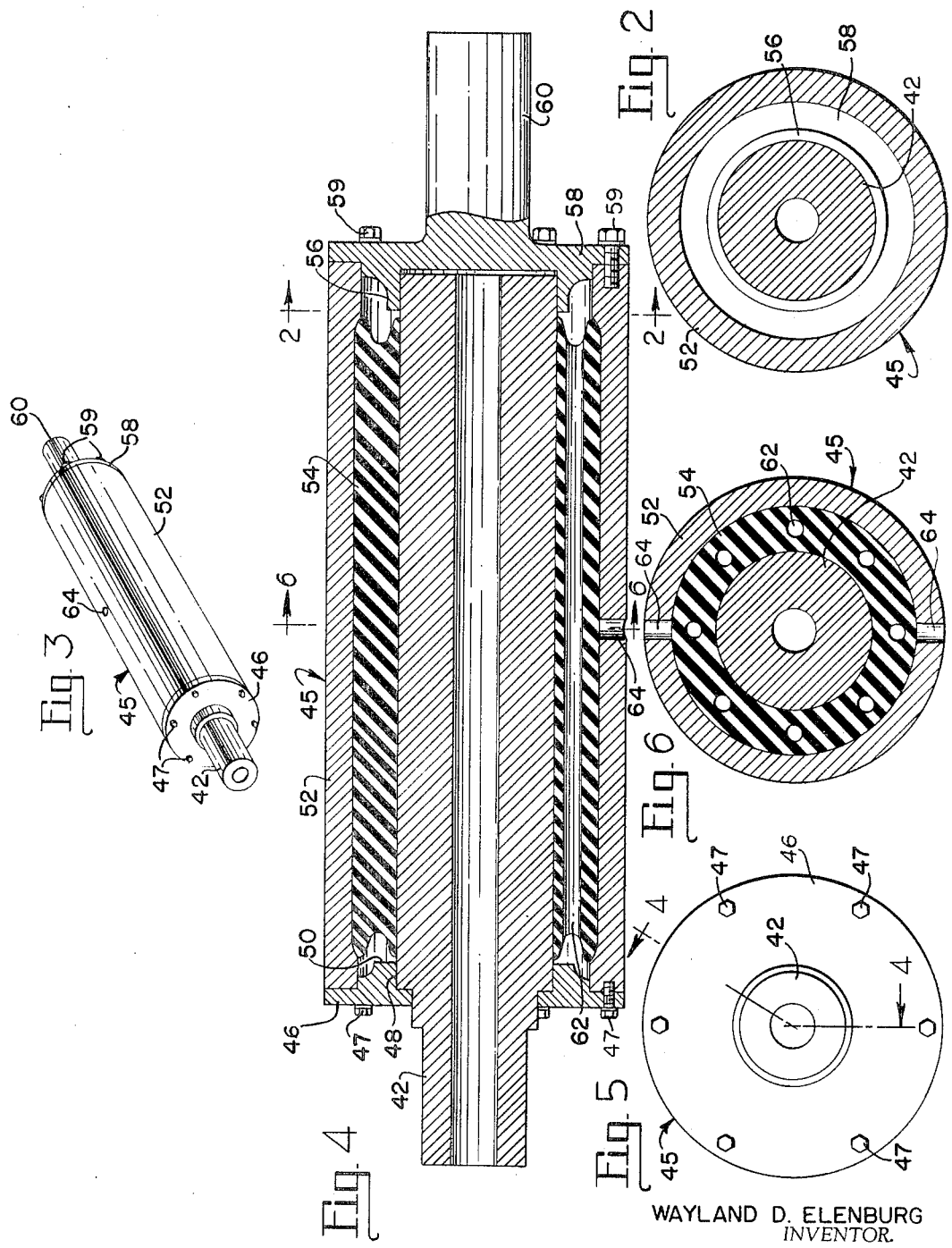
WAYLAND D. ELENBURG
INVENTOR.
BY *Wayland D. Keith*
HIS AGENT

United States Patent Office 3,304,747
Patented Feb. 21, 1967

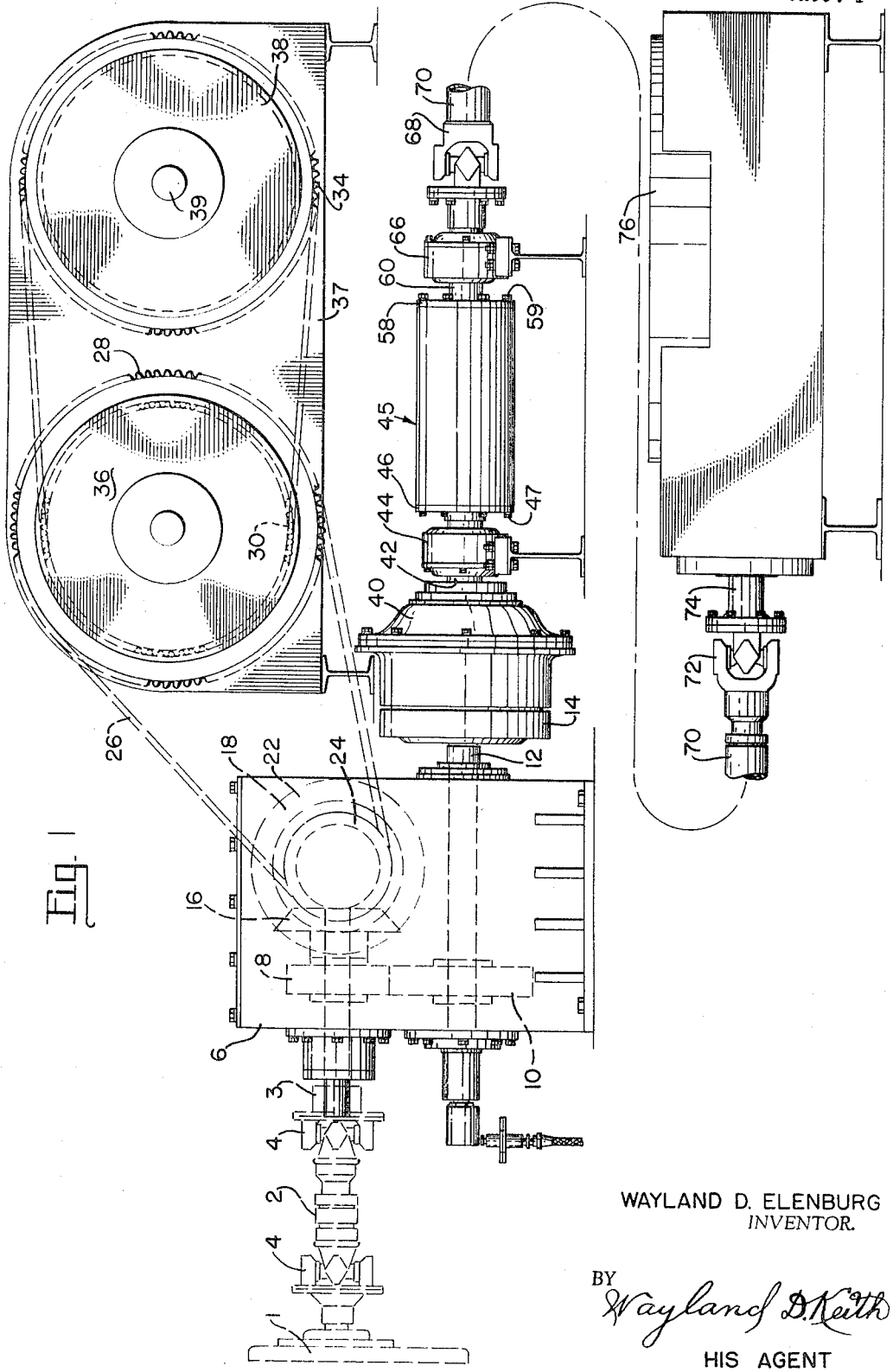

3,304,747
ELASTOMER SHOCK ABSORBER FOR A
DRIVE SYSTEM
Wayland D. Elenburg, Wichita Falls, Tex., assignor to Walker-Neer Manufacturing Co., Inc., Wichita Falls, Tex.
Filed Mar. 26, 1965, Ser. No. 442,959
6 Claims. (Cl. 64—27)

This invention relates to improvements in drive systems, and more particularly to drive systems where high impact starting and stopping is present, such as drives for well drilling rigs, particularly rotary well drilling rigs.

Various drive systems have been proposed heretofore, but these, for the most part, were not so constructed as to absorb high impact torsional shock, which shock was transmitted to the machinery and often caused premature weakening or giving away of the machinery.

The present drive system is so constructed that the final driven element may be started smoothly, rotated smoothly, and stopped smoothly, without the jerking that is usually accorded heavy loads such as rotary tables of drilling rigs, and the like.

While the present device has been shown as being used in conjunction with a rotary table drive of a rotary drilling rig, it is to be understood that it may be used to absorb shock on any form of drive to which the device is applicable.

The present drive utilizes an engine which couples, through a universal joint shaft, to a gear reduction unit, which gear reduction unit drives through a bevel gear arrangement to drive winding drums, such as used with drilling rigs, and another drive shaft drives through an air actuated clutch and a conventional "Dodge" coupling to drive through a torsion elastomer coupling to drive the rotary table through a universal joint arrangement.

An object of this invention is to provide a drive system between a prime mover and a driven element which will reduce the speed and drive, through a coupling, to give self-aligning features, and through an elastomer coupling to minimize torsional shock to the driven element.

Another object of the invention is to provide an elastomer torsion shock absorber which will absorb the impact between the prime mover and the driven element.

Still another object of the invention is to provide an elastomer torsion element intermediate a drive shaft and a driven shaft which shafts will always be maintained in axial alignment.

Still another object of the invention is to provide a cylindrical sleeve and a shaft which are co-axial, each of which has an annular ring of rubber banded thereto to form a shock absorbing torsional drive member.

With these objects in mind and others which will become manifest as the description proceeds, reference is to be had to the accompanying drawings in which like reference characters designate like parts in the several views of the drawings, in which:

FIG. 1 is a side elevational view of the drive system with parts being shown in full outline, other parts being shown in dashed outline, and still other parts thereof being broken away so as to shorten the drawing and to show details of construction;

FIG. 2 is a sectional taken on the line 2—2 of FIG. 4 looking in the direction as indicated by the arrows;

FIG. 3 is a perspective view of the torsion drive removed from the drive system;

FIG. 4 is a longitudinal, sectional view through the torsion drive element, showing the shaft thereof in axial, guided relation with respect to the housing;

FIG. 5 is an end view of the torsional drive as shown in FIGS. 3 and 4; and

FIG. 6 is a sectional view taken on line 6—6 of FIG. 4, looking in the direction indicated by the arrows.

With more detailed reference to the drawings, the numeral 1 designates generally a conventional prime mover, which has a drive shaft 2 extending outward therefrom. Universal joints 4 are positioned within the length of the drive shaft 2 so as to compensate for angular misalignment between prime mover 1 and a gear reduction unit 6 to which the drive shaft 2 is connected. A drive gear 8 is positioned within the gear reduction unit 6 and is in meshed driving relation with a spur gear 10 which drives shaft 12, to which a clutch 14 is secured.

A bevel gear unit 16 is in meshed driving relation with a complementary bevel gear unit 18, which bevel gear unit 18 has a shaft 20 extending outward therefrom on which a clutch 22 is mounted, so as to selectively engage and disengage drive sprocket 24. The drive sprocket 24 drives through endless transmission means, such as chain 26, to drive a sprocket 28. A sprocket 30 is associated with sprocket 28 in driving relation and has a chain 32 therearound and around sprocket 34 so that winch drums 36 and 38 may be selectively driven. The clutch 14, which is preferably an air actuated clutch, is connected with a conventional Dodge coupling 40 to drive a shaft 42 journaled in bearing 44.

The drive shaft 42 extends through an axial opening in cover plate 46 of the drive unit and is enlarged to form a bearing surface 48 within an inwardly extending projection 50, as will best be seen in FIG. 4. The outer periphery of the cover plate 46 is a cylindrical member 52, which cylinder member has a bore formed therein so as to form an annular space between the periphery of drive shaft 42 and the inner diameter of cylindrical member 52. An elastomer sleeve 54 is fitted within this annular space with the periphery of the elastomer sleeve being bonded to the inner diameter of cylindrical member 52, and with the inner diameter of elastomer sleeve 54 being bonded to the outer periphery of the enlarged portion of shaft 42.

The shaft 42 extends beyond the full length of the elastomer sleeve 54, with a portion of the shaft extending into a cylindrical cup member 56, which cup is made integral with a cap 58 on the end of a stub shaft 60. The cap 58 is bolted at circumferentially spaced intervals to cylindrical member 52. The shaft 60 is in axially aligned relation with shaft 42 and is so maintained at all times by bearing surface 48 and cylindrical cup member 56. It is preferable to have a plurality of spaced apart, cored holes 62 extending longitudinally the elastomer sleeve 54 intermediate the inner and outer diameters thereof, which holes may vary in number and in size according to the thickness and diameter of elastomer sleeve 54. Opposed radial holes 64 are provided within cylindrical member 52 intermediate the ends thereof, which holes facilitate molding and handling of the cylindrical member.

Bolts 47 secure cover plate 46 to cylindrical member 52 and bolts 59 secure cap 58 to the opposite end of cylindrical member 52, which bolts 59 transmit the torsion from cylindrical member 52 to the shaft 60 when rotary movement is applied to shaft 42.

By having the elastomer torsion element 54 encased within the cylindrical member 52 and constrained between cover plate 46 and cap 58 and bonded to the periphery of shaft 42 and to the inner diameter of cylindrical member 52, the elastomer sleeve 54 is always maintained undistorted, and in aligned relation with respect to the axis of shafts 42 and 60. It is preferable to have the shaft 42 journaled within bearing 44 and shaft 60 journaled within bearing 66 so as to drive the universal joint 68, drive shaft 70 and universal joint 72 to drive rotary table drive shaft 74 to rotate the rotary table 76 in a manner well understood in the art of oil well drilling.

OPERATION

With the engine or prime mover 1 driving, and with the clutch 14 engaged, the drive shaft 2 will rotate a shaft 3 on gear reduction unit 6, which shaft 3 has a spur gear 8 thereon which simultaneously drives reduction spur gear 10 and bevel gear units 16. The bevel gear unit 16 and 18 drive through clutch 22 to selectively rotate winch drums 36 and 38 journaled on the respective shafts 37 and 39. The spur gear 10 is secured to a shaft 12, within gear reduction unit 6, and drives through clutch 14 and "Dodge" coupling 40, and with the clutch 14 engaging the "Dodge" coupling 40, which coupling 40 has a cup shaped elastomer coupling therein, drives through shaft 42 and through elastomer torque coupling generally designated by the numeral 45, which torque coupling will transmit the torque therethrough, thereby absorbing much of the shock within the elastomer cylindrical member 54. The power is transmitted out through stub shaft 60 and through universal joint 68, drive shaft 70 and universal joint 72 to drive shaft 74 to rotate rotary table 76 in a manner well understood in the art of well drilling.

It is to be understood that the present device may be used on so-called stationary drives of various characters or it may also be used on portable drives, such as portable rotary well drills.

Having thus clearly shown and described the invention, what is claimed as new and desired to be secured by Letters Patent is:

1. A shock absorber for installation between axially aligned, rotatable drive and driven shafts, which shock absorber comprises:
   (a) a first shaft,
      (1) said first shaft having a shoulder formed thereon to form a bearing surface,
   (b) a cylindrical, elastomer sleeve surrounding said first shaft and being bonded thereto,
   (c) a cylindrical member surrounding said cylindrical, elastomer sleeve and being bonded thereto,
      (1) a cap secured to an end of said cylindrical member,
      (2) a second shaft secured to said cap and extending outward therefrom and being in axial alignment with said first shaft,
      (3) a cover plate secured to the other end of said cylindrical member, which cover plate has a shouldered opening formed therein to form a complementary bearing surface to receive said shouldered first shaft in journaled relation.

2. A shock absorber for installation between axially aligned, rotatable drive and driven shafts, as defined in claim 1, wherein:
   (a) said elastomer sleeve has circumferentially spaced holes extending longitudinally therethrough intermediate the outer diameter and the inner diameter thereof.

3. A shock absorber for installation between axially aligned, rotatable drive and driven shafts, which absorber comprises:
   (a) a first shaft,
   (b) an elastomer sleeve bonded to the outer diameter of said first shaft,
   (c) a cylindrical member surrounding said elastomer sleeve and having the outer diameter of the elastomer sleeve bonded to the inner diameter of said cylindrical member,
   (d) a cap fitted on an end of said cylindrical member and secured thereto,
      (1) a second shaft on said cap which extends outwardly therefrom in axially aligned relation with said first shaft,
      (2) an annular boss formed on said cap,
         (i) the outer diameter of said annular boss being fitted in piloted relation within the inner diameter of said cylindrical member,
         (ii) the inner diameter of said annular boss forming a bearing surface to receive an end portion of said first shaft in journaled relation,
   (e) a cover plate, having an axial hole formed therein, secured to the opposite end of said cylindrical member, and
      (1) said cover plate journaling said first shaft for limited arcuate movement therein.

4. A shock absorber for installation between axially aligned, rotatable drive and driven shafts, which shock absorber comprises:
   (a) a first shaft,
      (1) said first shaft having a shouldered portion thereon, near an end thereof, which forms a bearing surface,
   (b) an elastomer sleeve bonded to the outer diameter of said first shaft,
   (c) a cylindrical member surrounding said elastomer sleeve and having the outer diameter of the elastomer sleeve bonded to the inner diameter of said cylindrical member,
   (d) a cap fitted on an end of said cylindrical member and secured thereto,
      (1) a second shaft on said cap, which shaft extends outwardly from said cap in axially aligned relation with said first shaft,
   (e) a cover plate, having an axial hole formed therein, secured to the opposite end of said cylindrical member,
      (1) said cover plate having an annular boss formed thereon, with the outer diameter thereof fitted in piloted relation within the inner diameter of said cylindrical member,
      (2) the inner diameter of said annular boss forming a complementary bearing surface to receive the shouldered portion of said first shaft in journaled relation, and
      (3) said cover plate journaling said first shaft for limited arcuate movement therein.

5. A shock absorber for installation between axially aligned, rotatable drive and driven shafts, comprising:
   (a) a first shaft,
   (b) a cylindrical, elastomer tube surrounding said first shaft and being secured thereto in bonded relation,
   (c) a cylindrical housing surrounding said cylindrical, elastomer tube and having the inner diameter of the housing bonded to the outer diameter of said cylindrical elastomer tube,
   (d) a first cap having an axial hole formed therein,
   (e) an annular boss surrounding said hole and positioned intermediate the inner diameter and the outer diameter of said first cap,
      (1) the boss in said cap fitted in piloted relation in said cylindrical member,
      (2) said boss receiving said first shaft therethrough in journaled relation on the inner diameter thereof,
      (3) said cap secured in fixed relation on the end of said cylindrical housing,
   (f) said second cap having an annular boss formed thereon intermediate the center and the outer diameter thereof,
      (1) the outer diameter of said boss fitted in piloted relation with the inner diameter of said cylindrical housing,
      (2) the inner diameter of said annular boss being co-axial with said cylindrical housing and forming a recess to receive the inner end of said first shaft in bearing relation,
      (3) said second cap being fixedly secured to the end of said cylindrical housing, and
   (g) a second shaft extending outward from said second cap in axial aligned relation with said first shaft.

6. A shock absorber for installation between axially aligned, rotatable drive and driven shafts, as defined in claim 5, wherein:
   (a) circumferentially spaced, longitudinally aligned holes extend through said elastomer sleeve intermediate the inner diameter and the outer diameter thereof.

References Cited by the Examiner

UNITED STATES PATENTS

| | | | |
|---|---|---|---|
| 1,553,497 | 9/1925 | Baker | 74—665 |
| 1,570,243 | 1/1926 | Goeser et al. | 74—665 |
| 1,975,907 | 10/1934 | Strauss | 64—27 |
| 2,174,223 | 9/1939 | Frauenthal et al. | 64—11 |
| 2,691,283 | 10/1954 | Stover | 64—27 |
| 3,099,918 | 8/1963 | Garrett | 64—27 |
| 3,199,315 | 8/1965 | Morse | 64—27 |

FOREIGN PATENTS

| | | |
|---|---|---|
| 922,502 | 1/1955 | Germany. |

FRED C. MATTERN, JR., *Primary Examiner.*

HALL C. COE, *Examiner.*